United States Patent
Hamid et al.

(10) Patent No.: US 7,823,100 B1
(45) Date of Patent: Oct. 26, 2010

(54) GENERATING SELF-CHECKING TEST CASES FROM A REDUCED CASE ANALYSIS GRAPH USING PATH CONSTRAINTS

(75) Inventors: Adnan A. Hamid, Austin, TX (US); Arthur D. Flatau, Austin, TX (US)

(73) Assignee: Breker Verification Systems, Inc., Austin, TX (US)

(*) Notice: Subject to any disclaimer, the term of this patent is extended or adjusted under 35 U.S.C. 154(b) by 126 days.

(21) Appl. No.: 11/853,390

(22) Filed: Sep. 11, 2007

Related U.S. Application Data

(60) Provisional application No. 60/848,222, filed on Sep. 29, 2006.

(51) Int. Cl.
*G06F 17/50* (2006.01)

(52) U.S. Cl. .................. 716/4; 716/5; 714/724

(58) Field of Classification Search .......... 716/4–6; 714/724–728
See application file for complete search history.

(56) References Cited

U.S. PATENT DOCUMENTS

| | | | | |
|---|---|---|---|---|
| 4,716,564 | A | 12/1987 | Hung et al. | 714/738 |
| 5,202,889 | A | 4/1993 | Aharon et al. | 371/27 |
| 5,724,504 | A | 3/1998 | Aharon et al. | 395/183.09 |
| 5,995,915 | A | 11/1999 | Reed et al. | 702/119 |
| 6,141,630 | A | 10/2000 | McNamara et al. | 703/14 |
| 6,182,258 | B1 | 1/2001 | Hollander | 714/739 |
| 6,195,616 | B1 | 2/2001 | Reed et al. | 702/119 |
| 6,219,809 | B1 | 4/2001 | Noy | 714/724 |
| 6,266,787 | B1 | 7/2001 | McDermid et al. | 714/33 |
| 6,295,517 | B1 | 9/2001 | Roy et al. | 703/15 |
| 6,347,388 | B1 | 2/2002 | Hollander | 714/739 |
| 6,487,704 | B1 | 11/2002 | McNamara et al. | 716/5 |
| 6,499,132 | B1 | 12/2002 | Morley et al. | 716/5 |
| 6,502,232 | B1 | 12/2002 | Campenhout | 716/18 |
| 6,519,727 | B2 | 2/2003 | Noy | 714/724 |
| 6,526,562 | B1 | 2/2003 | Haddad et al. | 716/18 |
| 6,530,054 | B2 | 3/2003 | Hollander et al. | 714/739 |
| 6,647,513 | B1 | 11/2003 | Hekmatpour | 714/37 |
| 6,675,138 | B1 | 1/2004 | Hollander et al. | 703/13 |
| 6,684,359 | B2 | 1/2004 | Noy | 714/741 |

(Continued)

OTHER PUBLICATIONS

"Structured Testing: A testing Methodology Using the Cyclomatic Complexity Metric", by Arthur H. Watson and Thomas J. McCabe, http://www.mccabe.com/pdf/nist235r.pdf , Computer Systems Laboratory, National Institute of Standard and Technology, Sep. 1996.*

(Continued)

*Primary Examiner*—Thuan Do
*Assistant Examiner*—Nha T Nguyen
(74) *Attorney, Agent, or Firm*—Campbell Stephenson LLP; Jonathan N. Geld

(57) ABSTRACT

A method, system and apparatus for constructing a comprehensive test plan for a design under test (DUT) using a case analysis graph is provided. Embodiments of the present invention provide for automatically generating test cases of the test plan from the case analysis graph by traversing paths through the case analysis graph to select a sequence of components to be exercised by a DUT. Selection of the components is constrained by one or more rules. The rules, in aspects of the invention, provide for selection of specified components to be included in the sequence of components.

22 Claims, 11 Drawing Sheets

U.S. PATENT DOCUMENTS

| | | | |
|---|---|---|---|
| 6,687,662 B1 | 2/2004 | McNamara et al. | 703/14 |
| 6,698,003 B2 | 2/2004 | Baumgartner et al. | 716/4 |
| 6,968,285 B1 | 11/2005 | Hamid | 702/119 |
| 2001/0010091 A1 | 7/2001 | Noy | 716/4 |
| 2002/0073375 A1 | 6/2002 | Hollander | 714/739 |
| 2003/0188224 A1 | 10/2003 | Decker | 714/25 |
| 2004/0088677 A1 | 5/2004 | Williams | 717/104 |
| 2004/0133409 A1 | 7/2004 | Mukherjee et al. | 703/14 |
| 2005/0278702 A1* | 12/2005 | Koyfman et al. | 717/124 |
| 2006/0048026 A1 | 3/2006 | Fine et al. | 714/724 |
| 2006/0107141 A1 | 5/2006 | Hekmatpour | 714/724 |
| 2006/0107158 A1 | 5/2006 | Mishra et al. | 714/741 |
| 2007/0011631 A1 | 1/2007 | Fine et al. | 716/5 |
| 2007/0168727 A1 | 7/2007 | Fournier et al. | 714/25 |
| 2008/0091793 A1 | 4/2008 | Diroo et al. | 709/217 |
| 2008/0255813 A1 | 10/2008 | Fine et al. | 703/2 |

OTHER PUBLICATIONS

"Structured Testing: A Testing Methodology Using the Cyclomatic Complexity Metric," Arthur H. Watson et al., http://www.mccabe.com/pdf/nist235r.pdf, Computer Systems Laboratory, National Institute of Standard and Technology, Sep. 1996, pp. 1-124.

Mishra et al., "Graph-based Functional Test Program Generation for Pipelined Processors," 2004, IEEE, all pp.

Fine et al., "Coverage Directed Test Generation for Functional Verification using Bayesian Networks," 2003, ACM, all pp.

* cited by examiner

GENERATING SELF-CHECKING TEST CASES FROM A REDUCED CASE ANALYSIS GRAPH USING PATH CONSTRAINTS

CROSS-REFERENCES TO RELATED APPLICATIONS

This invention claims priority from Provisional Patent Application Ser. No. 60/848,222, entitled "HIERARCHICAL TEST CASE SYNTHESIS," filed Sep. 29, 2006, and naming Adnan A. Hamid as inventor. This provisional patent application is incorporated herein by reference in its entirety and for all purposes.

FIELD OF THE INVENTION

The present invention relates to the testing of designs under test, for example electronic systems, and, more particularly, to a method and apparatus for automatically generating tests for a design under test.

BACKGROUND OF THE INVENTION

Moore's Law states that the growth rate of transistors per chip is exponential. Assuming that a fraction of these transistors being used to create state bits (e.g., latches, flip-flops or other memory elements) has remained constant, it follows that the growth rate of state bits in digital systems is also exponential. The complexity of functionally testing a system grows exponentially with the number of state bits (e.g., doubling the number of state bits implies that there are four times as many possible states to be tested). Thus, the complexity of functionally testing or verifying a digital system has a growth rate that is doubly exponential. Growth in verification complexity has been empirically observed as the number of pre-silicon logic bugs in semiconductor chips increases exponentially at a rate of 3-4 times per product generation.

A functional verification process can be divided into three steps. First, a test plan is constructed defining the desired scenarios to be tested. Next, test cases are created and run to test each scenario. Each test case should sensitize one or more of the scenarios of interest, predict an expected outcome, and check the actual outcome from running the tests against this expected outcome. Finally, some form of coverage measurement can be used to measure how many of the desired test scenarios have actually been tested, providing an indication of the quality of functional verification. The number of scenarios that should be considered in this process tracks the complexity of functional verification and thus has a doubly exponential growth rate.

Currently, functional verification can consume up to 70% of design effort and is typically a critical path in product development cycles. The bulk of this functional verification effort is spent on creating test cases to address the very large number of scenarios in a test plan.

Today, the majority of silicon re-spins of semiconductor products are due to logic bugs, with each spin adding significant delay and expense to project development. Logic bugs occur due to bug escapes in a verification process, and are caused by failure to test a bug scenario that led to the problem. Lack of quality in a verification process can be traced to four primary causes of bug escapes. First, comprehensive test plans are difficult to write, and a bug scenario might not have been considered in the test plan. Second, it can be difficult to create test cases that cover the large number of scenarios to be considered. A bug scenario might have been considered in a test plan, but there might have been insufficient time and resources to create a test case for the bug scenario. Third, there are difficulties in measuring coverage of scenarios that have been tested, and a failure to hit the bug scenario may not have been detected. Finally, inefficient use of compute resources may mean that a verification process never reached the test case for the bug scenario.

Creating a test plan that considers all scenarios to be tested is a difficult process. Test plans are typically paper documents containing laundry lists of items to be tested. Gaps can occur in ensuring that this list is complete. Further, with this approach it is difficult to explicitly define the possible interactions and dependencies between the various items to be tested. Strategies have been proposed advocating creating test plan documents in a structured hierarchical outline, while other strategies include annotating test plan documents with additional information, such as coverage targets, to be used later in a verification process. Neither of these strategies solve the problem of creating a comprehensive test plan.

Traditional approaches for constructing test cases can be divided into constrained random generation approaches and Backus-Naur Form (BNF) grammar-based approaches. Constrained random generation approaches are used to create test cases as a series of constrained random transactions. Using such approaches, one can generate all possible transactions for a given interface to a system. However, complex systems require a carefully orchestrated set of transactions on multiple interfaces to test most scenarios of interest. It can be difficult, time consuming, and compute intensive to construct such a set of transactions with a test generator using constrained random generation. Further, constrained random generation-based approaches provide no solution to predicting an expected result from a test case generated using such a technique. Finally, constrained random generation promotes a "spray and pray" strategy based on an argument that running enough random cases will ensure that all cases of interest are hit. In reality, this is an inefficient approach because the bulk of compute cycles are spent on repeatedly testing common cases with only a small number of cycles being spent testing corner and error cases.

BNF grammars have also been used to define valid sequences of transactions for generation of test cases. But, because complex designs tend to support a large number of functions and function variations, a BNF grammar required to fully verify a complex design can get impractically large. Large and complex BNF grammars can be difficult to review for completeness. Further, BNF grammars can imply a large number of test cases, in which it is difficult to control which cases should be tested or measure which portions of the BNF grammar are covered.

Prior work in measuring functional coverage of a test plan uses a number of different techniques. Examples of functional coverage techniques include: code coverage, assertion coverage, and transaction coverage techniques. Code coverage techniques measure how much of a source code for a design has been exercised. Assertion coverage techniques depend on insertion of numerous assertions into the design to check for correct behavior. Assertion coverage measures how many of these checks have been exercised. Transaction coverage techniques focus on measuring a mix of transactions that have been applied to each interface of a design. None of these techniques provide a direct measure of how much of a test plan has been covered and thus do not provide a direct measure of the quality of functional verification. Instead, quality of functional verification must be inferred from information provided by these techniques, and it is often difficult to differentiate between coverage cases that have been poorly tested, and those that are not reachable.

Functional verification continues to be a critical bottleneck in developing digital systems. Test generation and coverage analysis are typically limited by lack of efficiency and lack of quality. To address these limitations, a practical strategy for constructing a comprehensive test plan that does not leave out important bug scenarios is desired. Further, an automated process for generating test cases from such a test plan to alleviate the effort that must be put into creating test cases is also desired. Such a test generation process should cover the entire test plan while making efficient use of available compute resources to enable testing of all scenarios of interest. Finally, a measure of how much of the test plan has been covered in functional verification is also desired.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a method, system and apparatus for constructing a comprehensive test plan for a design under test (DUT) using a case analysis graph. Embodiments of the present invention provide for automatically generating test cases of the test plan from the case analysis graph by traversing paths through the case analysis graph to select a sequence of components to be exercised by a DUT. Selection of the components is constrained by one or more rules. The rules, in aspects of the invention, provide for selection of specified components to be included in the sequence of components.

Typical Verification Process

Figure 1:
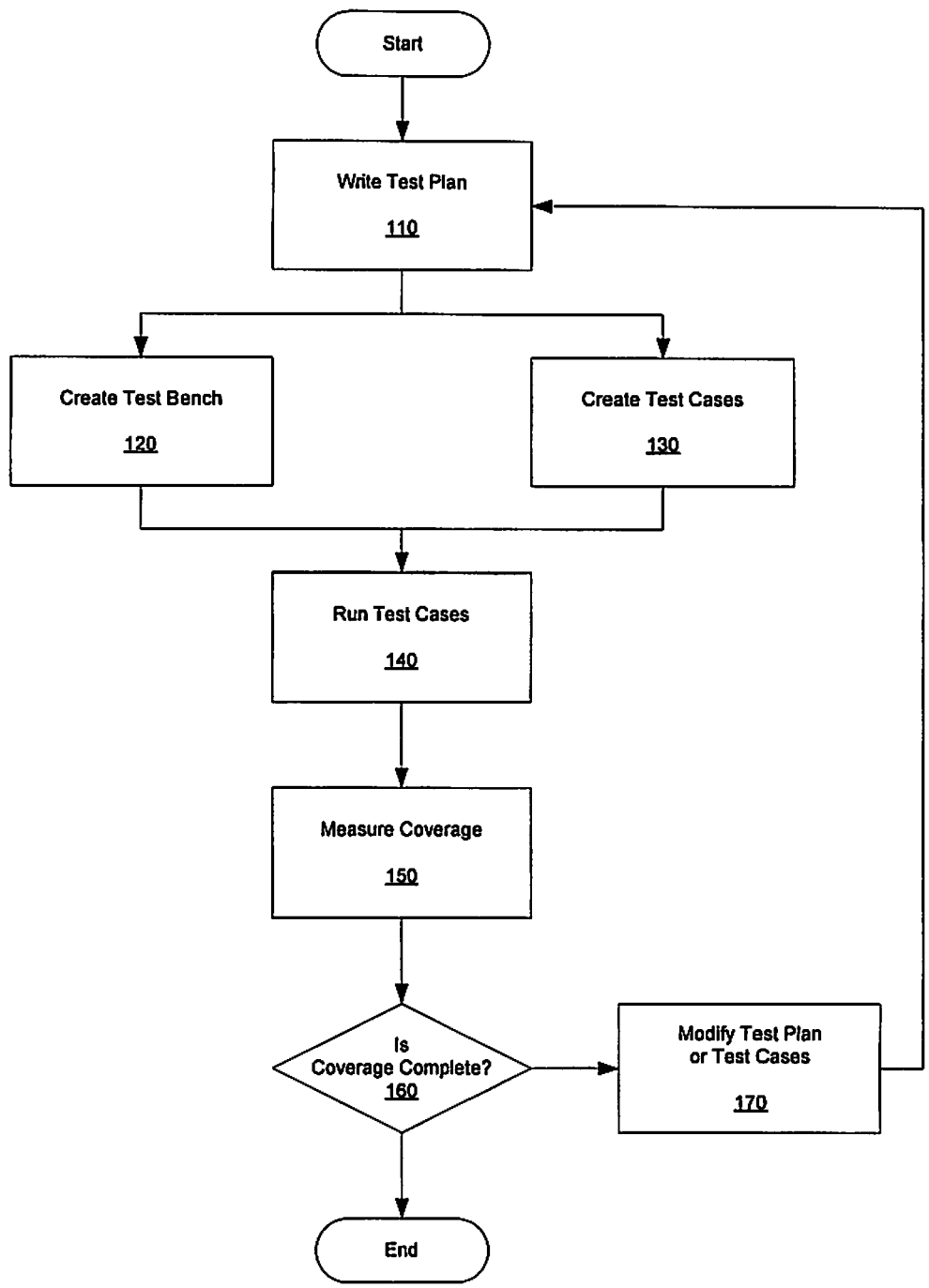
FIG. 1 is a simplified flow diagram illustrating a typical prior art process followed in functional verification.

FIG. 1 is a simplified flow diagram illustrating a typical prior art process followed in functional verification. Initially, a test plan is written to define the scenarios to be tested for a design under test (110). A test bench is developed that allows test cases to be exercised on the design under test (120). Test cases are created to test each of the scenarios defined in the test plan (130). Each test case is directed toward a scenario of interest and should predict an expected result. Each test case is run on the test bench and output from the run is compared against an expected result (140). Any mismatch in the comparison of output to expected result is indicative of a bug in the design under test that must be fixed. Quality of functional verification is then assessed by measuring achieved functional coverage (150). If the achieved functional coverage is complete, or above a predetermined limit, then the process is complete (160). Otherwise, modification of the test plan and/or test cases can be made to more effectively achieve desired functional coverage (170). This process of test plan generation, test plan execution, functional coverage and any subsequent reacting to the functional coverage (e.g., by modifying the test plan) is called a coverage closure loop.

Bottlenecks in various stages of the coverage closure loop can cause an exponential verification gap. Writing a comprehensive test plan (e.g., 110) that considers all scenarios that must be tested is problematic. Identification of every function that must be tested along with possible interactions and dependencies between those functions is required. Further, a great deal of effort is required to construct test cases to sensitize every scenario in the test plan and predict expected results for each of these scenarios (e.g., 130). Current constrained random approaches to creating test cases make inefficient use of compute resources when running test cases, with a bulk of compute cycles being spent repeatedly testing common cases and few cycles being spent on critical corner cases and error cases. Finally, existing metrics for measuring functional coverage (e.g., 150) make it difficult to assess how much of a test plan has been covered.

Verification Process Using Reduced Case Analysis Graphs

Figure 2:
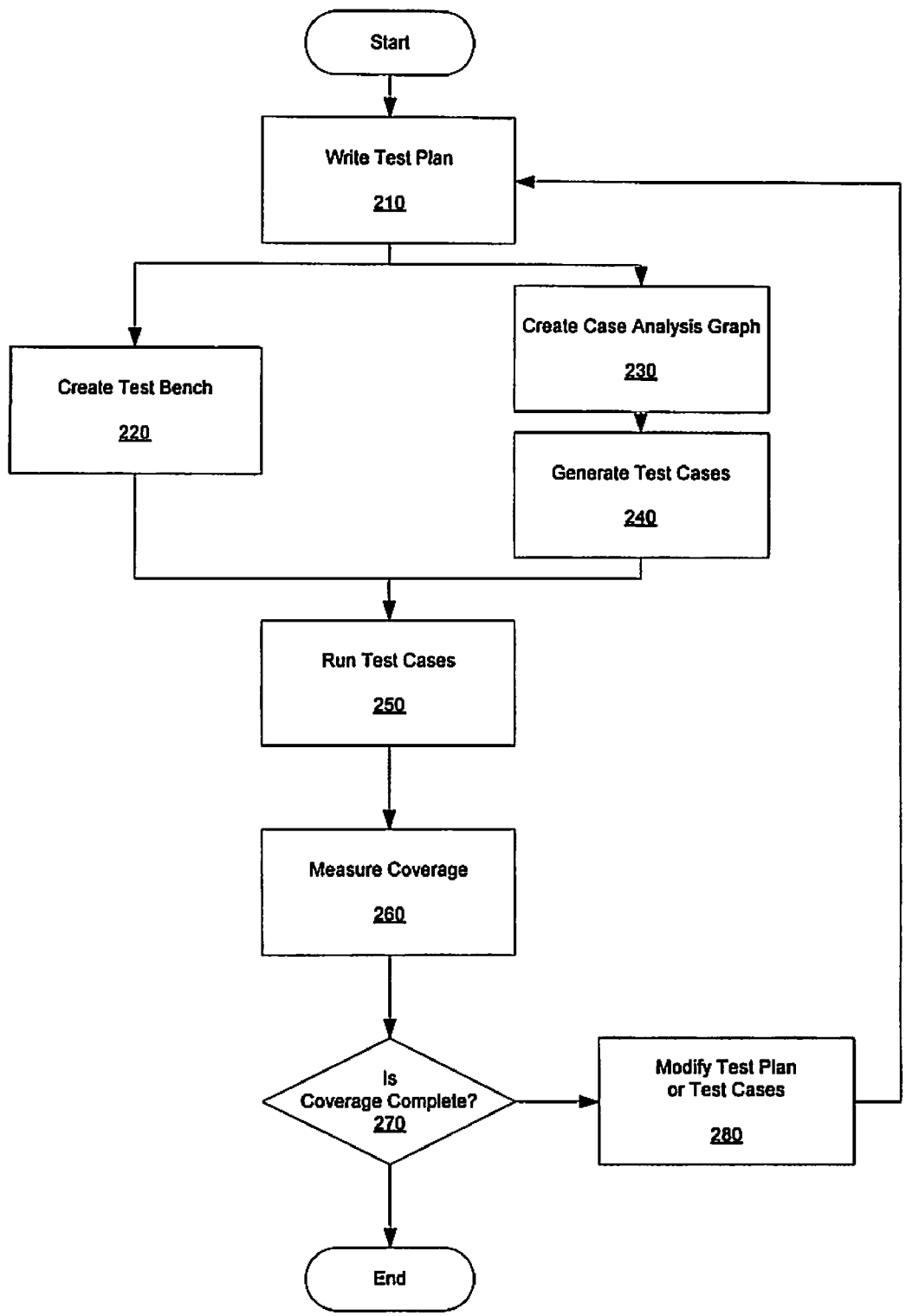
FIG. 2 is a simplified flow diagram illustrating a functional verification process in a accord with embodiments of the current invention.

FIG. 2 is a simplified flow diagram illustrating a functional verification process in accord with embodiments of the current invention. Much of the flow of the process illustrated in FIG. 2 is kept as similar as possible to the prior art process, thereby allowing continuation of familiar verification strategies and preservation of existing investments in verification infrastructure.

A test plan is written to define scenarios that must be tested (210). A test bench is constructed to allow test cases to be run on the design under test (220). A reduced case analysis graph is created that explicitly defines a comprehensive test plan, containing every function to be tested, and possible interactions and dependencies between those functions (230). Self-checking test cases are automatically generated from the reduced case analysis graph (240). Such test cases sensitize a scenario of interest and contain an expected result. The test cases are run on the test bench and the output from the run compared against the expected result (250). Any mismatch in the comparison between the output and expected result is indicative of a bug in the design under test that must be fixed. Quality of functional verification is then assessed by measuring achieved functional coverage (260). As with FIG. 1, in light of the assessment of achieved functional coverage, a determination is made as to whether coverage is "complete" within a predetermined standard, and if so, then the process ends, and if not, the test plan can be modified.

In FIG. 2, the task of writing the test plan (210), creating the test bench (220), and running test cases (250) are similar to the corresponding steps in the process illustrated in FIG. 1 (steps 110, 120 and 140, respectively). This permits following a familiar verification strategy and preservation of significant investments in test-bench tools when creating the test bench (220) and simulation tools when running test cases (250). Such tools bring significant value to the functional verification process and are taken advantage of in the current invention.

Construction of the reduced case analysis graph (230) uses the test plan from step 210. This test plan is subjected to rigorous case analysis to create a graph that defines all the scenarios to be tested. As discussed below, reduced case analysis graphs can be used to create compact representations of comprehensive test plans that consider not only every function that must be tested, but also the possible interactions and dependencies between those functions. Further, data visualization techniques can be applied to the reduced case analysis graph to enable review of the completeness of the test plan without having to look at complex source code.

As discussed below, the reduced case analysis graph can be "walked" along paths from node-to-node to automatically create self-checking test cases for the various scenarios described by the graph (240). Automating generation of test cases alleviates a key efficiency bottleneck in the functional verification process, and helps to eliminate bug escapes due to scenarios that could not be tested due to lack of time or resources to construct the test case. Note that the generated test cases can be constructed to run on an existing test bench, thereby preserving investments in test-bench tools and simulation tools.

The present invention augments coverage measurement (260) to include measurement of the coverage of the reduced case analysis graph in addition to existing techniques of code coverage, assertion coverage and transaction coverage. Measuring coverage on a reduced case analysis graph provides a direct measure of how much of the test plan has been covered by functional verification, and thus provides an accurate indication of the quality of functional verification. Measurement and collection of coverage data from a reduced case analysis graph is discussed in further detail below. Data visualization techniques can also be used to provide a visual representation of this information in the form of test plan coverage data. Direct measurement and visualization of test plan coverage data provides a mechanism to understand and analyze quality of functional verification. This further helps to eliminate bug escapes due to failure to detect that a particular test scenario has not been tested.

Constructing Reduced Case Analysis Graphs

The present invention provides an organizational strategy for constructing comprehensive test plans that compactly define scenarios to be tested on a design under test. One manner to organize and build such a test plan is to use hierarchical test case analysis to construct the reduced case analysis graph.

Hierarchical case analysis begins with the end in mind; that is, starting with the objective or goal of fully verifying the design under test. This goal is then decomposed into primary functions, interfaces and structures to be tested along with possible interactions between these components. Verifying each component becomes a sub-goal in the test plan. Each goal can be represented as a node in a case analysis graph, with arcs coupling the nodes representing possible interactions between goals. After top-level case analysis is completed, the process is recursively repeated for each sub-goal until the test plan is reduced to individual operations. The result of this process is successively decomposing the difficult task of verifying a complex system into smaller and smaller problems (sub-goals and individual operations) until all the steps required to test the design are understood. An example of hierarchical case analysis to construct comprehensive test plans is demonstrated in U.S. Pat. No. 6,968,285, entitled "Method and Apparatus for Scenario Search Based Random Generation of Functional Test Suites," which is incorporated herein for all that it teaches.

In the present invention, a case analysis graph is built using nodes to represent goals. Select goals are depicted using diamond-shaped nodes. When evaluated, a select goal executes any action associated with the node, and then uses a weighted-random decision to choose a child of the select goal to evaluate next. Child goals are coupled to their parent by an arc. Sequence goals are depicted by rectangle-shaped nodes. When evaluated, a sequence goal executes any action associated with the node, and then evaluates each child of the sequence node in order. Leaf goals are depicted by oval-shaped nodes that have no children. Leaf goals simply execute any associated actions. Arcs from a select goal to a child goal can be associated with a weighting factor, and arcs from a sequence goal to a child goal can be annotated with a repeat count. A default value for arcs can be assigned (e.g., a default weight or repeat count of one). It should be understood that shapes chosen for particular types of goals are a matter of choice and in no way limit the scope of the invention. It should also be understood that other types of goals with associated characteristics can be incorporated into embodiments of the present invention. For example, "meta-goal" that hides further goal decomposition underneath the meta-goal could be used (and represented by, for example, an octagon-shaped node).

Figure 3:
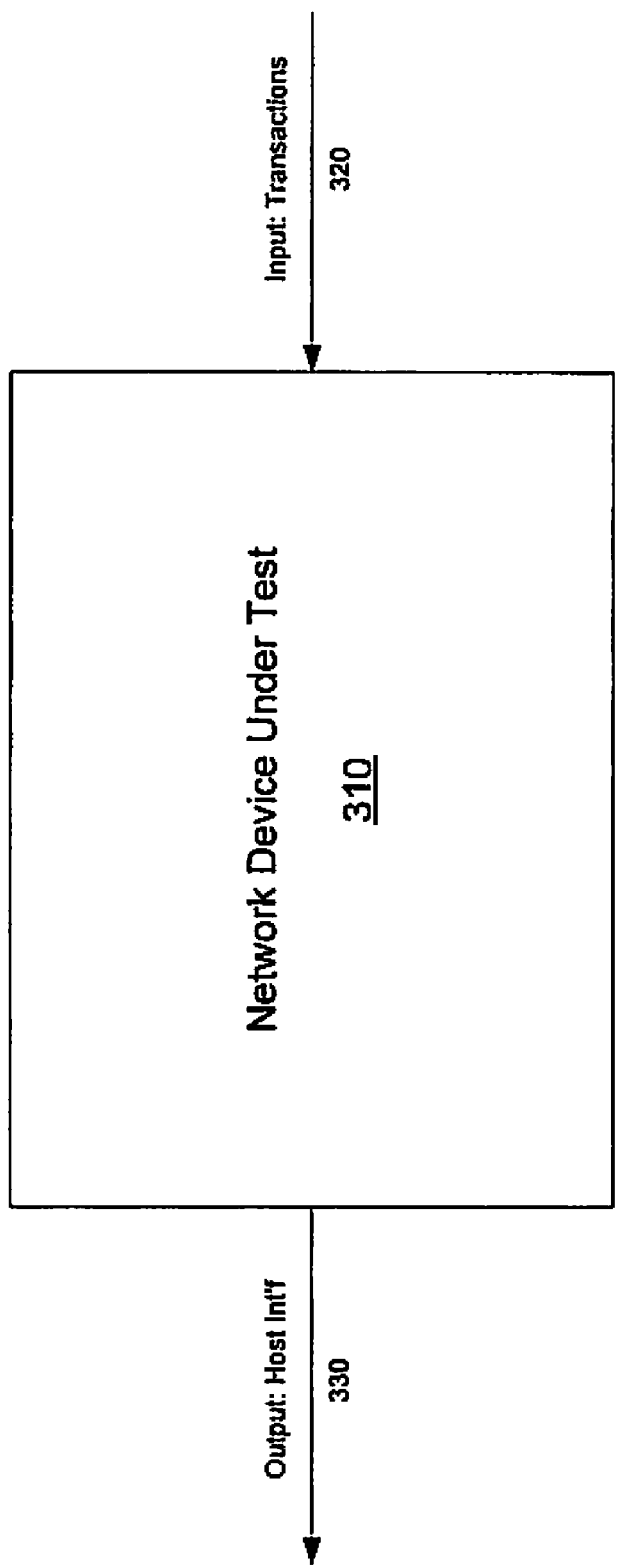
FIG. 3 illustrates an example of a design under test used to describe embodiments of the present invention.

An example of construction of a reduced case analysis graph is discussed below with regard to a design under test illustrated in FIG. 3. FIG. 3 is a simplified block diagram illustrating an example network device 310 configured to receive input transactions 320 and transmit output information 330. Input transactions 320 must be organized as stateful connections, meaning that a connection must first be established, then data transferred using one or more read and write operations, and finally the communication circuit must be disconnected. For purposes of this example, network device 310 should also report connection errors and guarantee stall free performance if alternate reads and writes are provided.

As discussed above, for network device 310 stateful input transactions can include an open connection, a close connection, a read command or a write command. To open a connection, a source and a destination for the connection should be provided. Closing a connection requires no source or destination, but merely an indication that the connection should be closed. Reading and writing transactions can include an address from or to which data would be read or written. In addition, any particular identifying information related to a specific type of memory can also be provided. A write transaction will also include data that is being written to the memory address.

Figure 4:
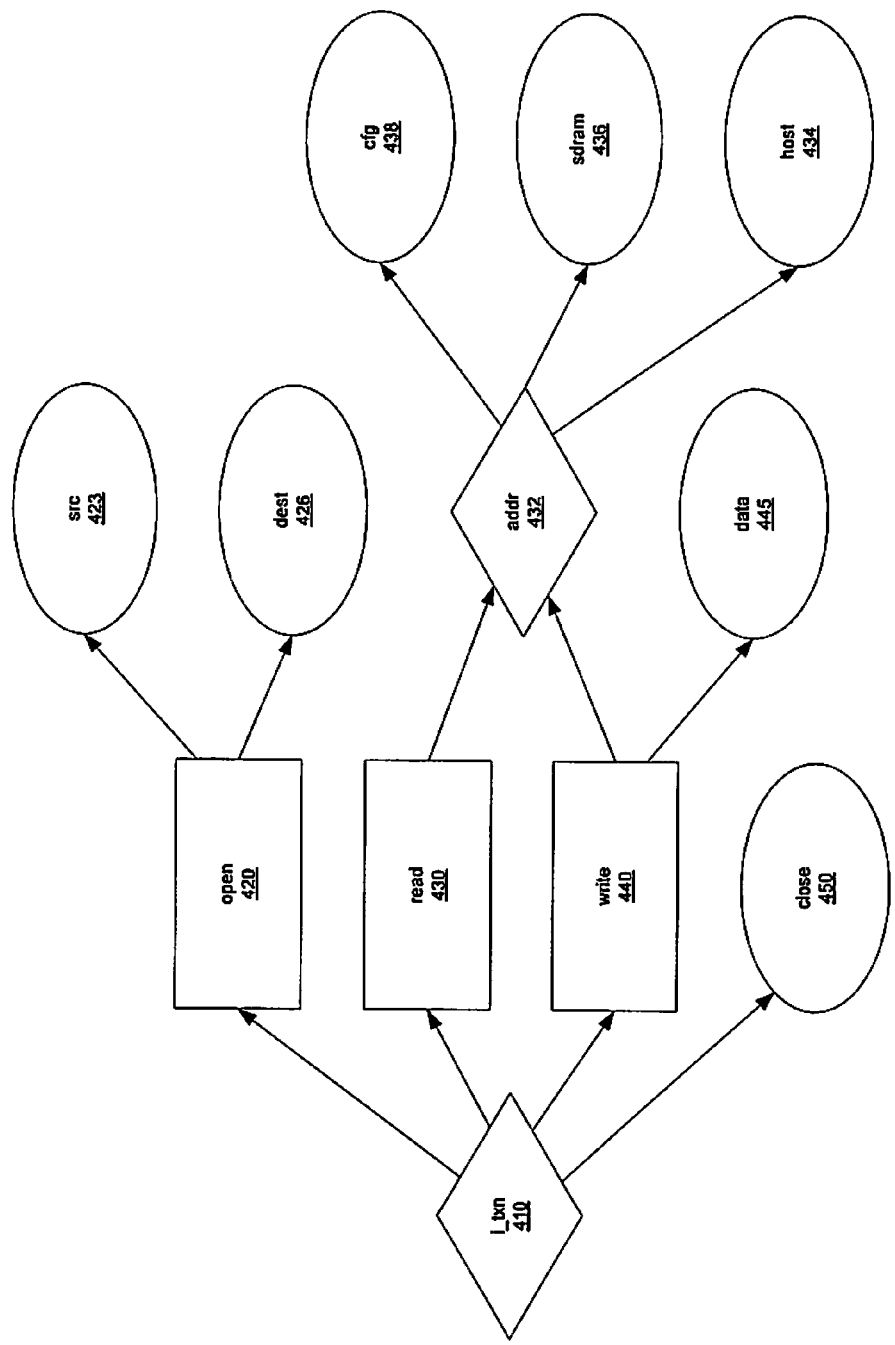
FIG. 4 is an illustration of a case analysis graph associated with input transactions for the design under test illustrated in FIG. 3, in accord with embodiments of the present invention.

FIG. 4 is an illustration of a case analysis graph associated with input transactions for network device 310. Input transactions to the network device (e.g., 320) are represented by select goal 410 which is coupled to goals associated with each type of transaction: open (420), read (430), write (440) and close (450). The relationship between select goal 410 and goals 420, 430, 440 and 450 is that of a select goal in which any operation associated with select goal 410 is performed and then one of goals 420, 430, 440 and 450 is selected for evaluation. Selection of a goal to process after a select goal is either a random or a weighted random selection, depending upon whether a weight value is associated with any of the arcs coupling the select goal to the children. Open goal 420 (associated with the open connection state) is illustrated as a sequence goal having leaf goals providing source state (423) and destination state (426). As discussed above, a sequence goal such as open goal 420 executes any action associated with goal 420 and then it will evaluate each child of the sequence goal in order, from top to bottom as depicted. A sequence goal associated with a read state (430) is coupled to a select goal for an address state (432), which has child leaf goals providing information or instructions corresponding to devices supporting the address: a host node (434), an SDRAM (436) and a configuration memory (438). Input transaction sequence goal associated with a write state (440) is also associated with address information in a manner similar to that of read state goal 430, and thus is also coupled to the address state select goal 432. A write transaction will also contain data to be written, illustrated by data leaf node 445.

The case analysis graph illustrated in FIG. 4 provides a simple mechanism for illustrating all the possible types of input transactions for the network device illustrated in FIG. 3. Different input scenarios can require the inclusion or exclusion of certain paths through the input transaction section of the case analysis graph. This introduces the concept of path constraints in a case analysis graph. For example, one input scenario could require the exclusion of using config addresses. An instruction can be provided in a goal corresponding to that input scenario to mask the config node. Such a mask command would disable the arc between address select goal 432 and config leaf goal 438. In another example, an input scenario could require data generation. A goal associated with such an input scenario could include a command to force use of data node 445. Such a force command requires a path through write sequence goal 440 thereby effectively excluding the arcs connecting sequence goal 410 with goals 420, 430 and 450 (but still including address goal 432, which is linked to both goal 430 and 440).

Figure 5:
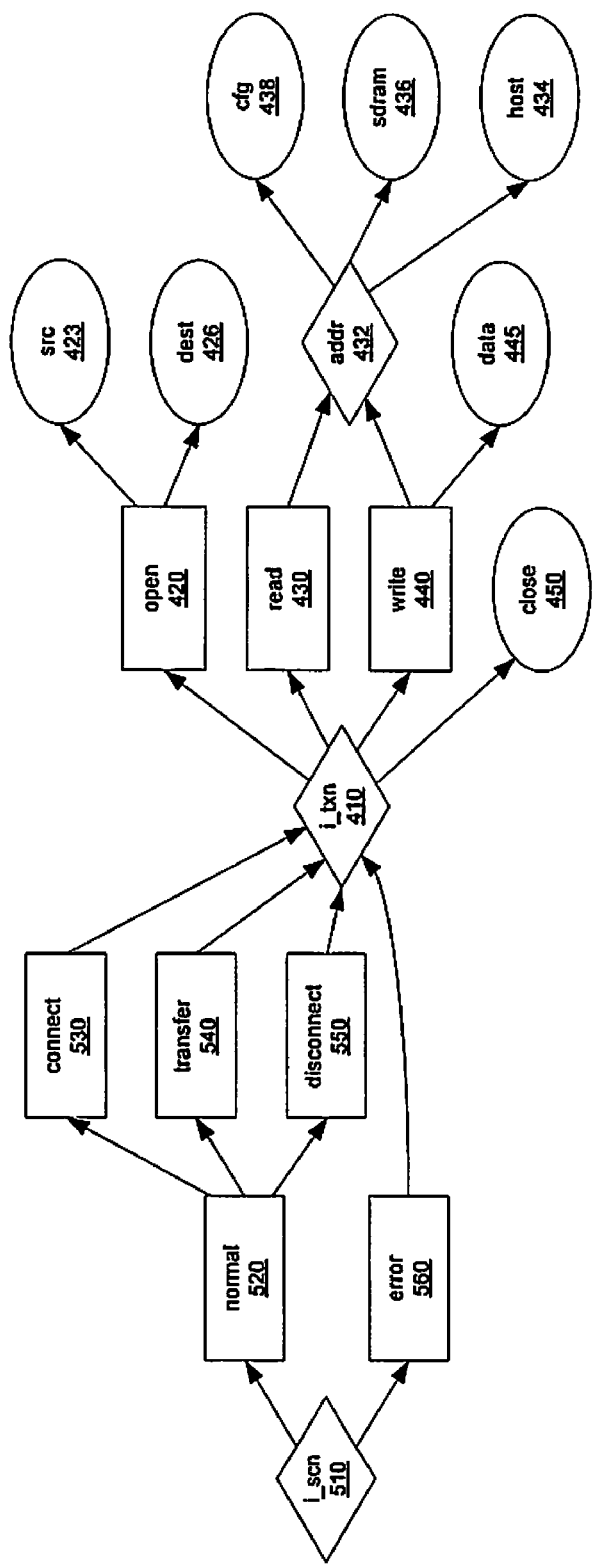
FIG. 5 is an illustration of an extension to the case analysis graph depicted in FIG. 4, in which input scenarios are depicted, in accord with embodiments of the present invention.

FIG. 5 is an illustration of an extension to the case analysis graph depicted in FIG. 4, in which input scenarios are depicted. For network device 310 a "normal" input scenario sequence can include a connection, a transfer of data, and a disconnection of a communication circuit between a source and destination. Behavior of the network device as it responds to an error input scenario should also be investigated.

The case analysis graph in FIG. 5 provides a select goal associated with input scenarios (510), which is coupled to a sequence goal 520 corresponding to normal input scenarios and a sequence goal 560 corresponding to the error condition. The normal input scenario sequence is represented by a connect goal 530, a transfer goal 540, and a disconnect goal 550, all of which are sequence goals. Each of the normal scenario sequence goals can be programmed with path constraint commands to select appropriate downstream nodes needed to effect the particular scenario. For example, a connect (530) can force a path to open (420). A data transfer (540) involves reading and writing, and therefore would mask paths to open (420) and close (450). Finally, a disconnect (550) corresponds to closing the connection, and would therefore force a path through close (450) to be followed. Thus, path constraints in case analysis graphs of the present invention provide a simple mechanism (e.g., one line of code) to specify the actions that occur in the transaction, and thereby define what should happen for a good stateful connection. Similarly, for the error scenario 560 a data transfer could occur without a prior opening of a connection and therefore the open sequence goal (420) can be masked in the error goal. The case analysis graph illustrated in FIG. 5 provides a simple mechanism for describing all input scenarios for input transactions 320 associated with network device 310.

Figure 6:
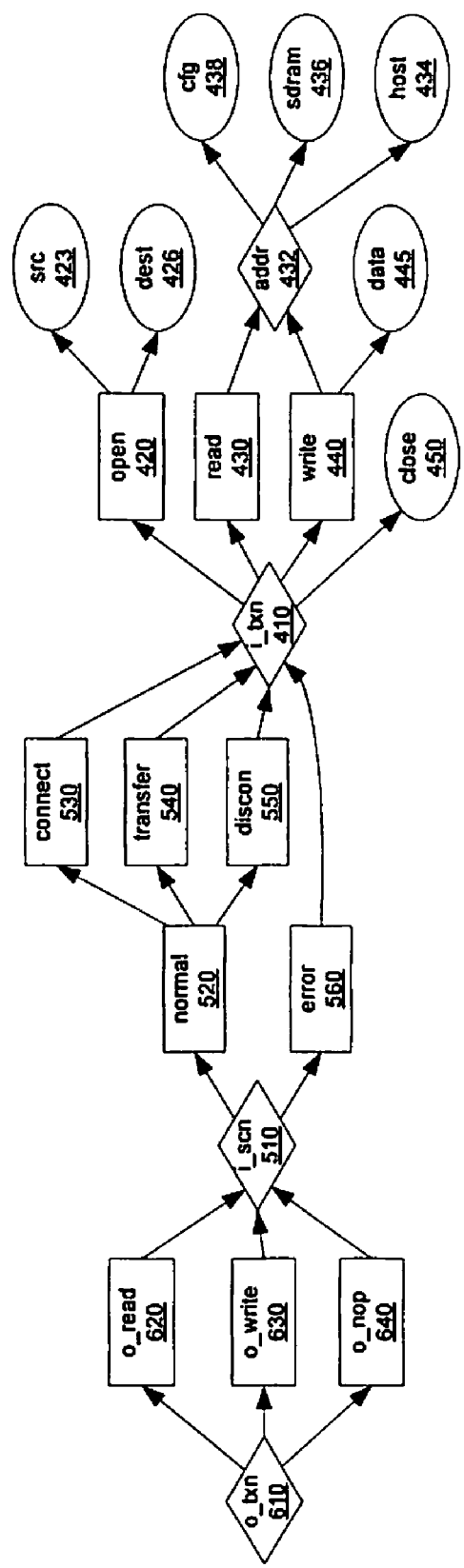
FIG. 6 illustrates a further continuation of the case analysis graph from FIGS. 4 and 5, in which output transactions are depicted, in accord with embodiments of the present invention.

FIG. 6 illustrates a further continuation of the case analysis graph from FIGS. 4 and 5. FIG. 6 illustrates a set of output transactions associated with network device 310. Typical outputs of a network device 310 can include an output read, an output write, and an erroneous operation included to force testing of the error condition.

FIG. 6 provides an output transaction select goal 610 which has children corresponding to the output transaction cases. Output read sequence goal 620 can, for example, force a path through normal input scenario goal 520 and input transaction read goal 430 (e.g., using a command such as force (normal, read)). The expected outcome of such an output transaction is an output read. Output write sequence goal 630 can similarly force a path through input scenario normal goal 520 and input transaction write goal 440, with an expected outcome of an output write. Finally, output nop sequence goal 640 can force a path through input scenario error goal 560. This illustrates that multiple path constraints can be set at a particular goal in a path. Path constraints collect as the path is walked down the case analysis graph, so a path can become more restricted as the path is walked.

It should be noted that each output transaction has an associated expected result. Such expected results associated with output transactions contribute to the generation of self-checking test cases through the use of the case analysis graph, because should an output provided by a particular path not match the predicted result, then the device will have failed that test case.

Figure 7:
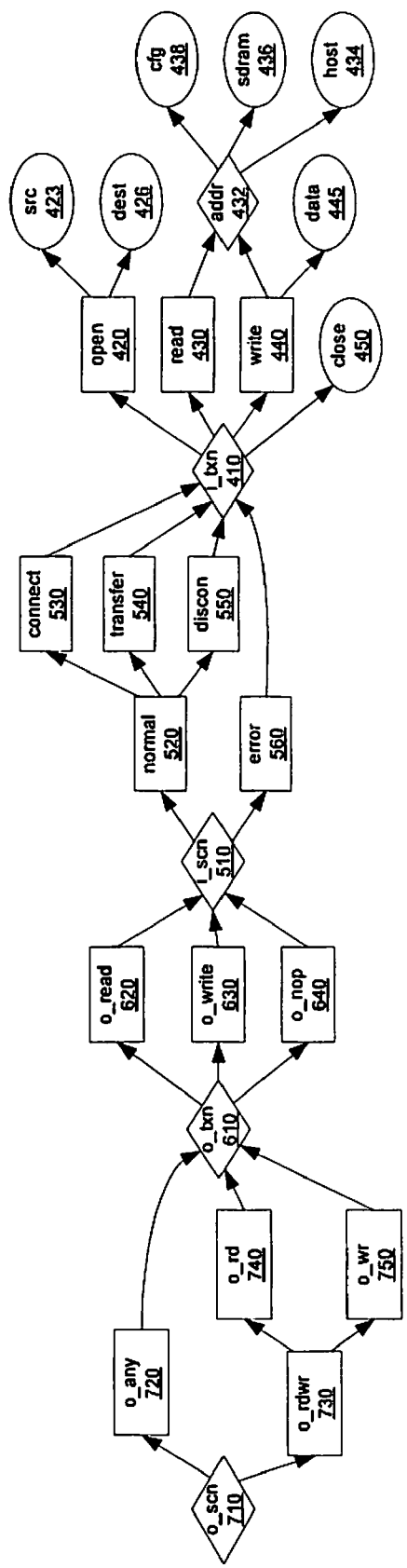
FIG. 7 illustrates a further extension of the case analysis graph of FIGS. 4-6, in which output scenarios are depicted, in accord with embodiments of the present invention.

FIG. 7 illustrates a further extension of the case analysis graph of FIGS. 4-6, by including nodes related to expected output scenarios for network device 310. These output scenarios go beyond examining single output transactions from FIG. 6 and examine groups of transactions. One possible output scenario is random output reads and writes with no constraints on what the output should be. Alternatively another scenario provides for alternating reads and writes. Such a scenario is warranted in light of one of the example requirements for network device 310 guaranteeing stall free performance with alternating reads and writes.

FIG. 7 illustrates a select goal 710 corresponding to the set of output scenarios. Output scenario select goal 710 is further coupled to an "any output" sequence goal 720 and a "read/write" sequence goal 730. The "any output" sequence goal is coupled to the output transaction select goal at which any of a read, a write, or a nop is selected. "Read/write" sequence goal 730 is coupled to output read sequence goal 740, which forces a path through the output transaction read select goal 620. "Read/write" sequence goal 730 is also coupled to an output scenario write sequence goal 750, which forces a path through output transaction write select goal 630.

FIG. 7 thereby provides a simple mechanism to model each expected output scenario for network device 310 in light of each possible input transaction. Additional modifications to the case analysis graph can be made in order to provide for preferential selection of selected arcs from select goals. For example, typical operation of network device 310 could result in 70% of input transaction corresponding to reads, 20% corresponding to writes and the remaining 10% being divided equally between opens and closes. A weighting factor can be associated with each arc coupling input transaction node 410 to select goals 420, 430, 440 and 450. Thus, when input transaction select goal 410 is executed selection of a particular arc can be influenced by those set percentages, if not otherwise dictated by a mask or a force.

Test cases can be generated by "walking" down the case analysis graph. As the case analysis graph is walked from node to node, path constraints accumulate and, where appropriate, will dictate which nodes are included in a test case. As stated above, for each test case generated the expected outcome is known because the outcomes are defined during specification of the output transactions. During generation of test cases, information related to the traversed paths and nodes of the case analysis graph can be tracked. This information can then be used to analyze test case coverage of each node in the case analysis graph. Metrics can be defined for whether a node has been sufficiently covered, questionably covered, or not covered at all (e.g., no path traversed a particular node). If a goal is never touched during test case generation, this may be indicative of bad assumptions or errors in creation of the case analysis graph and further work may need to be performed to ensure coverage of that node.

Path Constraints

As discussed above, path constraints are used in defining paths through a case analysis graph. Path constraints provide a simple means for defining goals associated with transactions or scenarios. Two example types of path constraints are a mask and a force.

Figure 8:
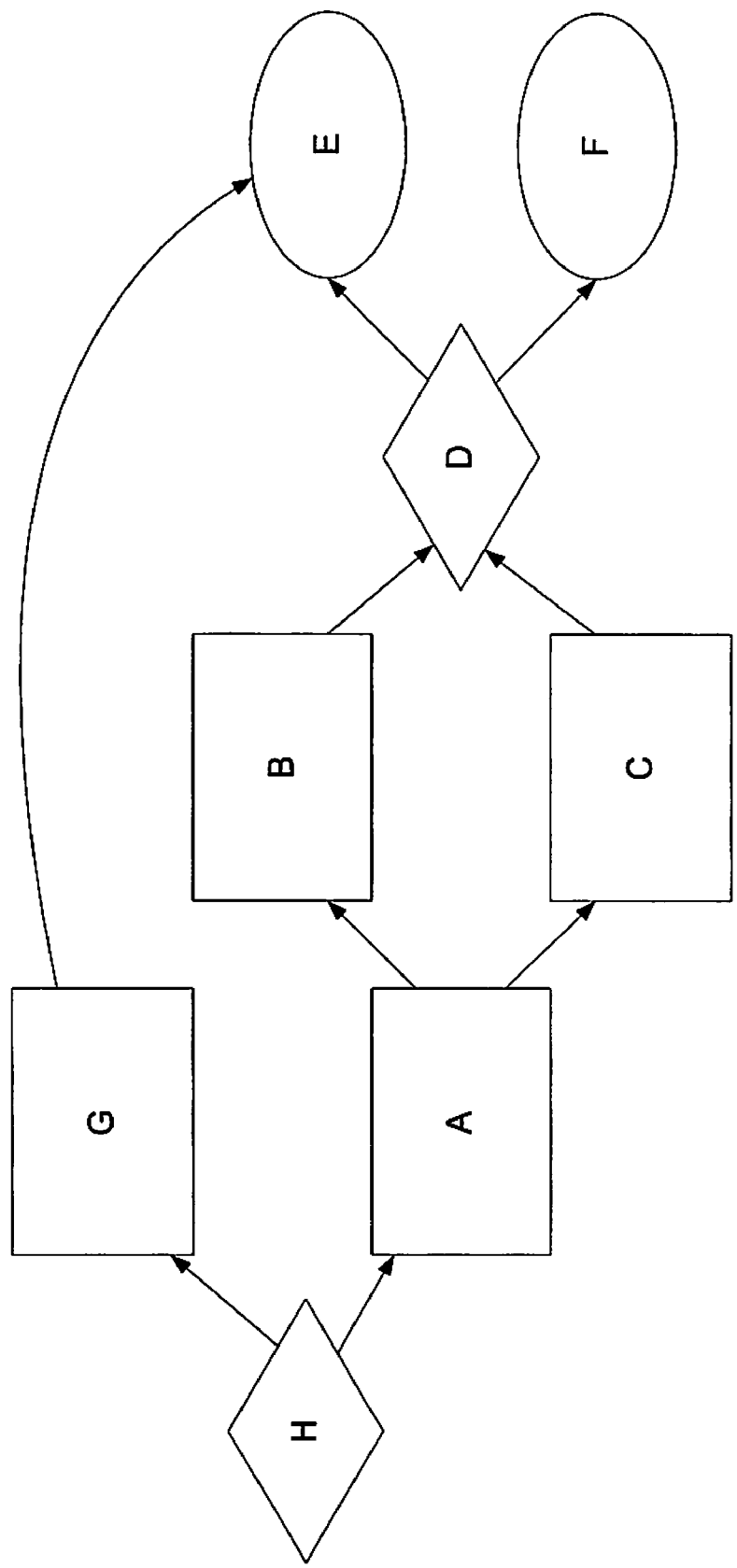
FIG. 8 illustrates a case analysis graph configured in accord with embodiments of the present invention.

FIG. 8 illustrates a case analysis graph in accord with embodiments of the present invention. FIG. 8 is provided to illustrate concepts of the above path constraints.

As discussed above, a mask between two nodes prevents any path traversal that includes the first node to also include the second node. A mask is effected by searching each enabled path between the two nodes, looking "upstream" of the second node to the node's parents until a select goal is encountered that has one or more alternate arcs enabled, and then disabling the arc from the select goal parent to the node traversed to arrive at the parent. An error condition is reported if no paths exist between the two nodes, or if no qualifying select goal is encountered on a path. For example, using FIG. 8, if select goal H contains an instruction to mask E then the arc between D and E would be disabled as would the arc between H and G. If in addition select goal H contains an instruction to mask F, disabling the arc between H and A would leave no alternate arcs from H, resulting in an error condition.

As also discussed above, a force between two nodes requires that any path traversal that includes the first node must also include the second node. A force is effected searching each possible path between the two nodes, looking upstream of the second node to the node's parents to find each select goal in the path. All arcs from each encountered select goal, aside from the arc traversed to get to the select goal, are disabled. But if, by looking upstream, an arc is encountered that was disabled while applying this force, then that arc is re-enabled. An error condition is reported if no enabled paths exist between the two nodes. For example, in FIG. 8 if select goal H contains an instruction to force E, then the arc between H and A would be disabled by following the path E-G-H. But when subsequently following the path E-D-B-A-H, the path between H and A must be re-enabled. Following path E-D-B-A-H would also cause the arc between D and F to be disabled.

Path Inheritance

The present invention further provides for downstream nodes to inherit characteristics of parent nodes in a path. Such characteristics can include variables, (called slots), that are set by upstream nodes as well as functions (called methods).

In general, if a child node needs to use a slot or a method that the child node does not have a definition for, then the current path being traversed is searched upstream to find a parent node that provides a definition for that slot or method. Alternatively, slots and method definitions can be tracked as the case analysis graph is traversed so that when a child node is encountered that does not have a definition for a particular slot or method, the tracked memory slots and methods can be reviewed for the definition.

Figure 9:
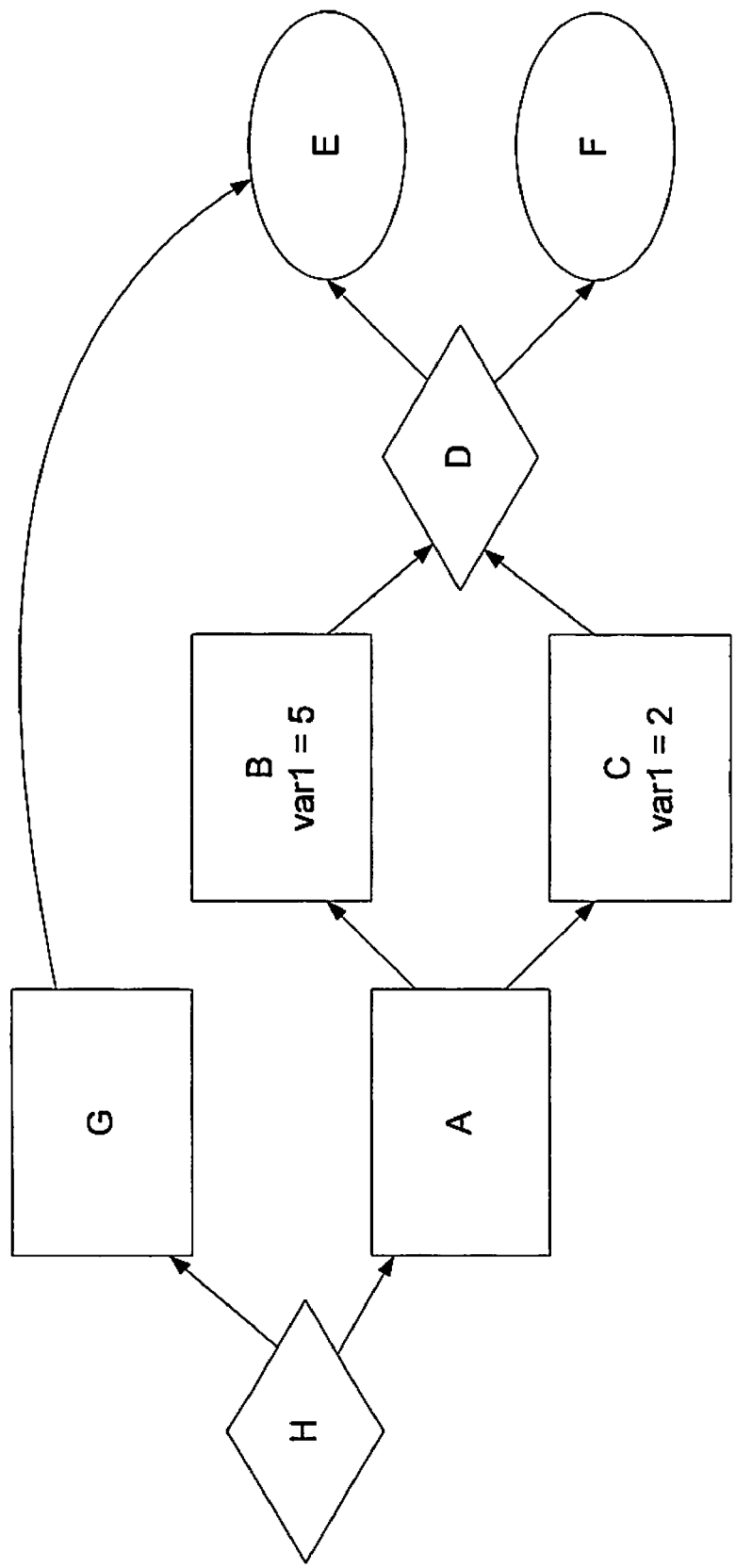
FIG. 9 illustrates a case analysis graph illustrating an example of path inheritance in accord with embodiments of the present invention.

FIG. 9 illustrates a case analysis graph illustrating an example of path inheritance in accord with embodiments of the present invention. In FIG. 9, node B defines a variable var1=5, while node C defines var1=2. If node F requires var1, depending upon which path was taken to arrive at F, var1 will equal either 5 or 2. Var1 is defined as the case analysis graph is walked and placed in a data set that is provided to node F (and other downstream nodes).

Similarly, nodes B and C can define a particular function in different ways but which is identified by a same identifier. If node F requires that function, that function will be defined depending upon the path taken to arrive at node F. The present invention also uses more traditional concepts of inheritance wherein child nodes can inherit common data and functions from parent nodes (e.g., a child can inherit base functionality from a parent and subsequently define specialization related only to the child).

An Example of Test Case Generation

Figure 10:
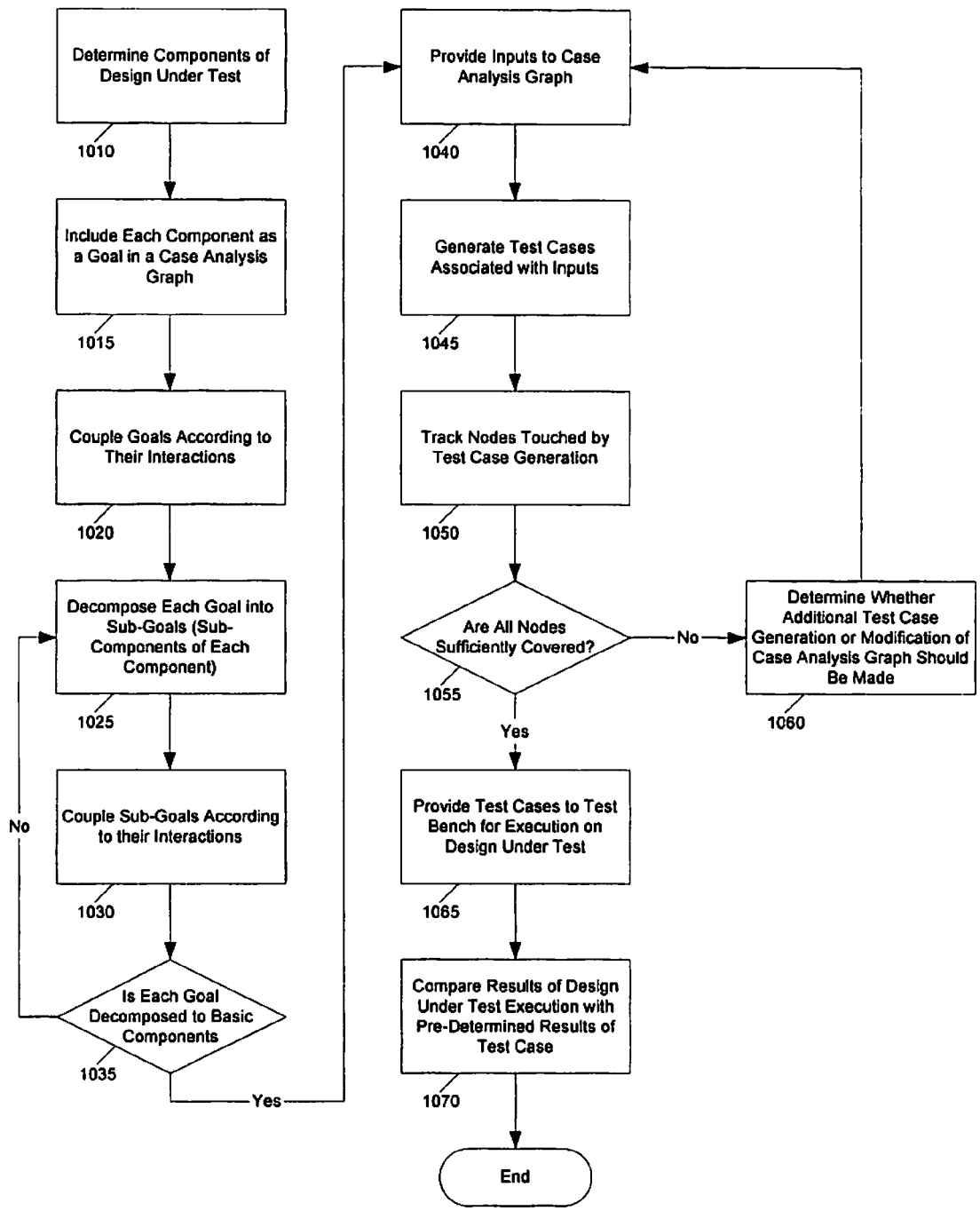
FIG. 10 is a simplified flow diagram illustrating one example of test case generation in accord with embodiments of the present invention.

FIG. 10 is a simplified flow diagram illustrating one example of test case generation in accord with embodiments of the present invention. As discussed above, initially a determination is made as to what are the components of the design under test (DUT) (1010). These components include the functions, interfaces and structures of the DUT. This determination can be aided by design documents such as design specifications, functional descriptions, and the like. Each component can then be included as a goal in a case analysis graph representing the test plan for the DUT (1015). The goals are then coupled according to their interactions (1020). Such coupling can be graphically included in the case analysis graph using arcs, as discussed above. Also, as discussed above, the coupling can include an indication of weighting preference for a particular interaction (from a select goal) or a number of iterations (from a sequence goal).

Each goal can then be decomposed into sub-goals, wherein each sub-goal is a sub-component of each component (1025). Thus, sub-functions and sub-structures are included in the case analysis graph. These sub-goals are then be coupled according to their various interactions in a manner similar to that described for the goals (1030). A determination is then made as to whether each goal has been decomposed into its basic components (1035). If not, then further decomposition takes place. Otherwise, initial formation of the case analysis graph, and thus the test plan, is complete.

Test cases are then generated using the case analysis graph by providing inputs to the functions represented by the case analysis graph (1040) and then "walking" through the various nodes of the case analysis graph using each input (1045). A test case can be built by assembling the functions associated with each goal traversed. For each test case generated, the nodes touched by the test case are tracked (1050). The results of the tracking can be displayed on the case analysis graph by labeling each node with colors depicting, for example, whether the node has been repeatedly touched by the test cases, infrequently touched, or not touched at all. Various ranges of node coverage can be set and associated with colors for visual display of test case coverage. A determination can then be made if all nodes of the case analysis graph are sufficiently covered by the generated test cases (1055). If not, then a determination can be made as to whether additional test case generation is desirable or if a modification of the case analysis graph should be made in order to ensure sufficient coverage (1060).

Once it has been determined that all nodes of the case analysis graph have been adequately covered, the test cases can be provided to a test bench coupled to the DUT for execution on the DUT (or a simulation thereof) (1065). Results of the execution of the test cases are then compared with the pre-determined results of the test cases (since those results were determined during the creation of the case analysis graph) (1070). To the extent that the execution results do not agree with the pre-determined results, this is indicative of potential problems with the DUT that may require modifications.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

An Example Computing And Network Environment

As shown above, the present invention can be implemented using a variety of computer systems. An example of one such computing environment is described below with reference to FIG. 11.

Figure 11:
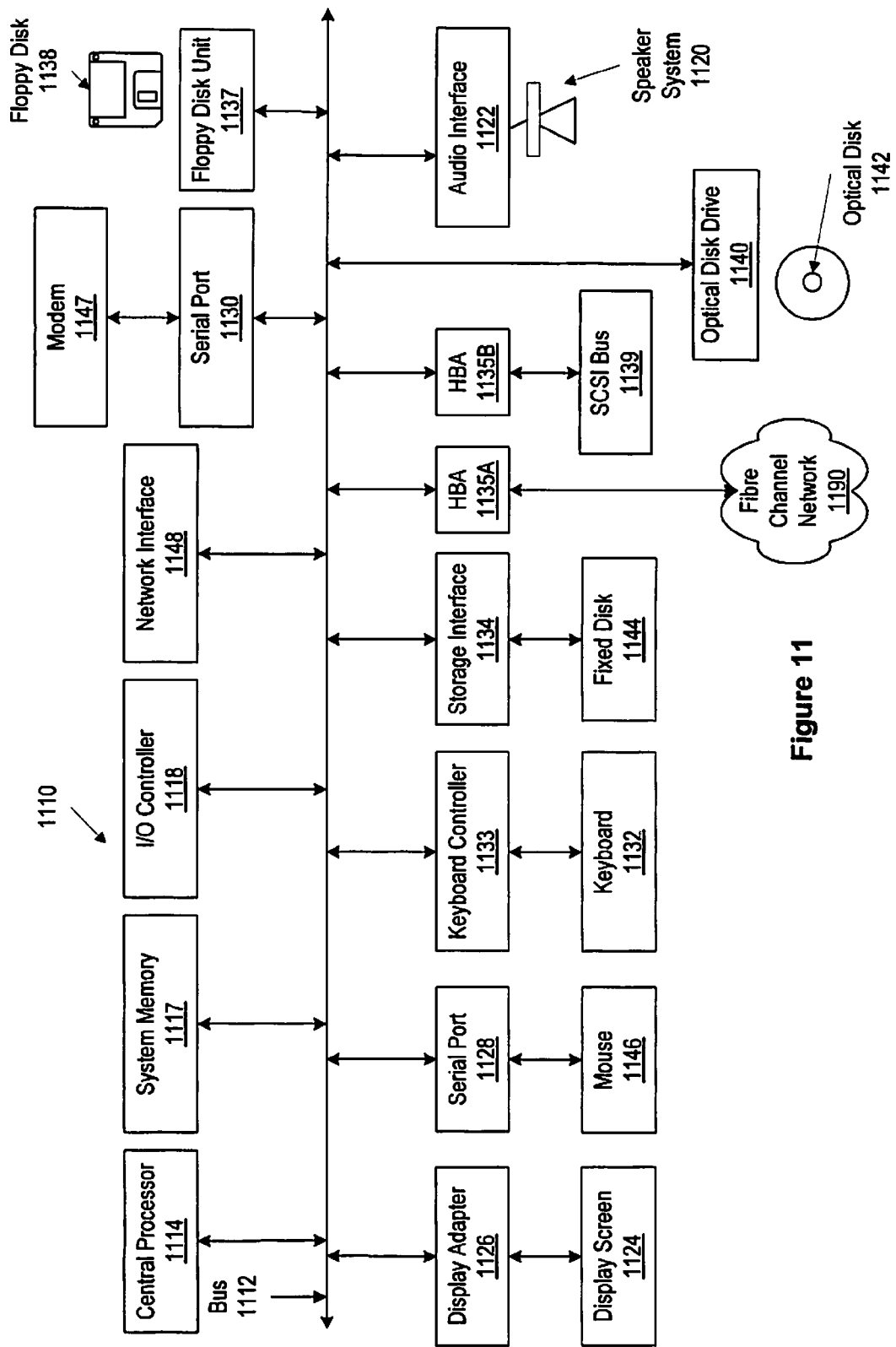
FIG. 11 depicts a block diagram of a computer system suitable for implementing embodiments of the present invention.

FIG. 11 depicts a block diagram of a computer system 1110 suitable for implementing the present invention. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present invention. The devices and subsystems can be interconnected in different ways from that shown in FIG. 11. The operation of a computer system such as that shown in FIG. 11 is readily known in the art and is not discussed in detail in this application. Code to implement the present invention can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1110). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method for generating a test case for a circuit design under test (DUT) comprising:
   generating a case analysis graph comprising components of each desired function of the DUT, wherein
      said generating is performed using the computer,
      the case analysis graph defines a test plan for the DUT,
      each component is represented in the case analysis graph by one or more goal nodes, and
      each goal node comprises one of a select goal for selecting one child node from a plurality of child nodes, a sequence goal for selecting each of a plurality of child nodes, and a leaf goal for providing an associated action; and
   selecting a sequence of the components to be exercised by the DUT as a test case, wherein
      said selecting is performed by traversing a path through the case analysis graph,
      the path comprises links coupling adjacent components in the sequence of components,
      each link is associated with one of a weighting factor if coupled to a select goal and a repeat count if coupled to a sequence goal,
      said selecting is constrained by one or more rules,
      said selecting comprises using weighted random selection of a link from the select goal to an associated child node from a plurality of links from the select goal to associated child nodes, each link having an associated weighting factor, and
      said selecting further comprises including a child node of the sequence goal in the sequence of the components a number of times corresponding to the repeat count associated with a corresponding link to the child node.

2. The method of claim 1, wherein
   the sequence of components begins at a first component in the case analysis graph, and
   the sequence of components is selected from a plurality of component sequences that begin at the first component.

3. The method of claim 2 wherein a rule of the one or more rules requires the sequence of components to include a specified second component found in one or more of the plurality of component sequences.

4. The method of claim 3 further comprising:
   traversing an upstream path from the second component to the first component; and
   for each component of the sequence of functions forming the upstream path,
      determining if the component is linked to a plurality of downstream components, and
      in response to said determining, disabling links to all downstream components other than the component traversed in the upstream path.

5. The method of claim 4 further comprising:
   enabling the link to the component traversed in the upstream path, if the link to the component traversed in the upstream path is previously disabled.

6. The method of claim 2 wherein a rule of the one or more rules requires the sequence of components to exclude a specified second component found in one or more of the plurality of component sequences.

7. The method of claim 6 further comprising:
   traversing an upstream path from the second component to the first component; and
   for each component of the sequence of functions forming the upstream path, determining if the component is linked to a plurality of downstream components, and in response to said determining, disabling the link to the component traversed in the upstream path.

8. A system for generating a test case for a circuit design under test (DUT) comprising:

a test bench configured to execute a test plan on the design under test (DUT); and a processor, coupled to the test bench, and configured to generate a case analysis graph comprising components of each desired function of the DUT, and select a sequence of components to be exercised by the DUT as a test case, wherein the case analysis graph defines a test plan for the DUT, each component is represented in the case analysis graph by one or more goal nodes, each goal node comprises one of a select goal for selecting one child node from a plurality of child nodes, a sequence goal for selecting each of a plurality of child nodes, and a leaf goal for providing an associated action, said selecting is performed by traversing a path through the case analysis graph, the path comprises links coupling adjacent components in the sequence of components, each link is associated with one of a weighting factor if coupled to a select goal and a repeat count if coupled to a sequence node, said selecting is constrained by one or more rules, said selecting comprises using weighted random selection of a link from the select goal to an associated child node from a plurality of links from the select goal to associated child nodes, each link having an associated weighting factor, and said selecting further comprises including a child node of the sequence goal in the sequence of the components a number of times corresponding to the repeat count associated with a corresponding link to the child node.

9. The system of claim 8, wherein the sequence of components begins at a first component in the case analysis graph, and the sequence of components is selected from a plurality of component sequences that begin at the first component.

10. The system of claim 9 wherein a rule of the one or more rules requires the sequence of components to include a specified second component found in one or more of the plurality of component sequences.

11. The system of claim 10 wherein the processor is further configured to:

traverse an upstream path from the second component to the first component;

for each component of the sequence of functions forming the upstream path, determine if the component is linked to a plurality of downstream components, and in response to said determining, disable links to all downstream components other than the component traversed in the upstream path.

12. The system of claim 11 wherein the processor is further configured to:

enable the link to the component traversed in the upstream path, if the link to the component traversed in the upstream path is previously disabled.

13. The system of claim 8 wherein a rule of the one or more rules requires the sequence of components to exclude a specified second component found in one or more of the plurality of component sequences.

14. The system of claim 13 wherein the processor is further configured to:

traverse an upstream path from the second component to the first component;

for each component of the sequence of functions forming the upstream path, determine if the component is linked to a plurality of downstream components, and in response to said determining, disable the link to the component traversed in the upstream path.

15. A computer-readable storage medium comprising:

a first set of instructions, executable by a processor, configured to generate a case analysis graph comprising components of each desired function of a circuit design under test (DUT), wherein the case analysis graph defines a test plan for the DUT, each component is represented in the case analysis graph by one or more goal nodes, and each goal node comprises one of a select goal for selecting one child node from a plurality of child nodes, a sequence goal for selecting each of a plurality of child nodes, and a leaf goal for providing an associated action; and a second set of instructions, executable by the processor, configured to select a sequence of components to be exercised by the DUT as a test case, wherein said selecting is performed by traversing a path through the case analysis graph, the path comprises links coupling adjacent components in the sequence of components, each link is associated with one of a weighting factor if coupled to a select goal and a repeat count if coupled to a sequence node, said selecting is constrained by one or more rules said selecting comprises using weighted random selection of a link from the select goal to an associated child node from a plurality of links from the select goal to associated child nodes, each link having an associated weighting factor, and said selecting further comprises including a child node of the sequence goal in the sequence of the components a number of times corresponding to the repeat count associated with a corresponding link to the child node.

16. The computer-readable storage medium of claim 15, wherein the sequence of components begins at a first component in the case analysis graph, and the sequence of components is selected from a plurality of component sequences that begin at the first component.

17. The computer-readable storage medium of claim 16 wherein a rule of the one or more rules requires the sequence of components to include a specified second component found in one or more of the plurality of component sequences.

18. The computer-readable storage medium of claim 17 further comprising:

a third set of instructions, executable by the processor, configured to traverse an upstream path from the second component to the first component; and for each component of the sequence of functions forming the upstream path, a fourth set of instructions, executable by the processor, configured to determine if the component is linked to a plurality of downstream components, and a fifth set of instructions, executable by the processor, configured to, in response to said determining, disable links to all downstream components other than the component traversed in the upstream path.

19. The computer-readable storage medium of claim 18 further comprising:

a sixth set of instructions, executable by the processor, configured to enable the link to the component traversed in the upstream path, if the link to the component traversed in the upstream path is previously disabled.

20. The computer-readable storage medium of claim 16 wherein a rule of the one or more rules requires the sequence of components to exclude a specified second component found in one or more of the plurality of component sequences.

21. The computer-readable storage medium of claim 20 further comprising:

a third set of instructions, executable by the processor, configured to traverse an upstream path from the second component to the first component; and for each component of the sequence of functions forming the upstream path, a fourth set of instructions, executable by the processor, configured to determine if the component is linked to a plurality of downstream components, and a fifth set of instructions, executable by the processor, configured to, in response to said determining, disable the link to the component traversed in the upstream path.

22. An apparatus for generating a test case for a circuit design under test (DUT) comprising:

means for generating a case analysis graph comprising components of each desired function of the DUT, wherein said generating is performed using the computer, the case analysis graph defines a test plan for the DUT, each component is represented in the case analysis graph by one or more goal nodes, and each goal node comprises one of a select goal for selecting one child node from a plurality of child nodes, a sequence goal for selecting each of a plurality of child nodes, and a leaf goal for providing an associated action; and means for selecting a sequence of components to be exercised by the DUT as a test case, wherein said means for selecting comprises means for traversing a path through the case analysis graph, the path comprises links coupling adjacent components in the sequence of components, each link is associated with one of a weighting factor if coupled to a select goal and a repeat count if coupled to a sequence node, said means for selecting is constrained by one or more rules, said means for selecting comprises means for weighted random selection of a link from the select goal to an associated child node from a plurality of links from the select goal to associated child nodes, each link having an associated weighting factor, and said means for selecting further comprises including a child node of the sequence goal in the sequence of the components a number of times corresponding to the repeat count associated with a corresponding link to the child node.

* * * * *